Nov. 20, 1945.    T. L. GATKE    2,389,253
BEARING
Filed Feb. 12, 1944
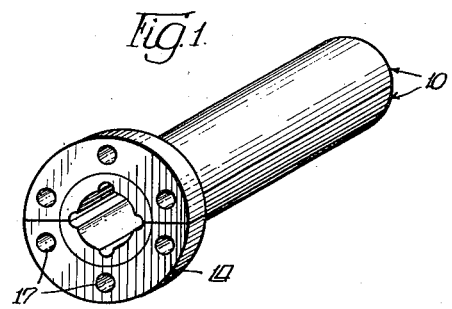
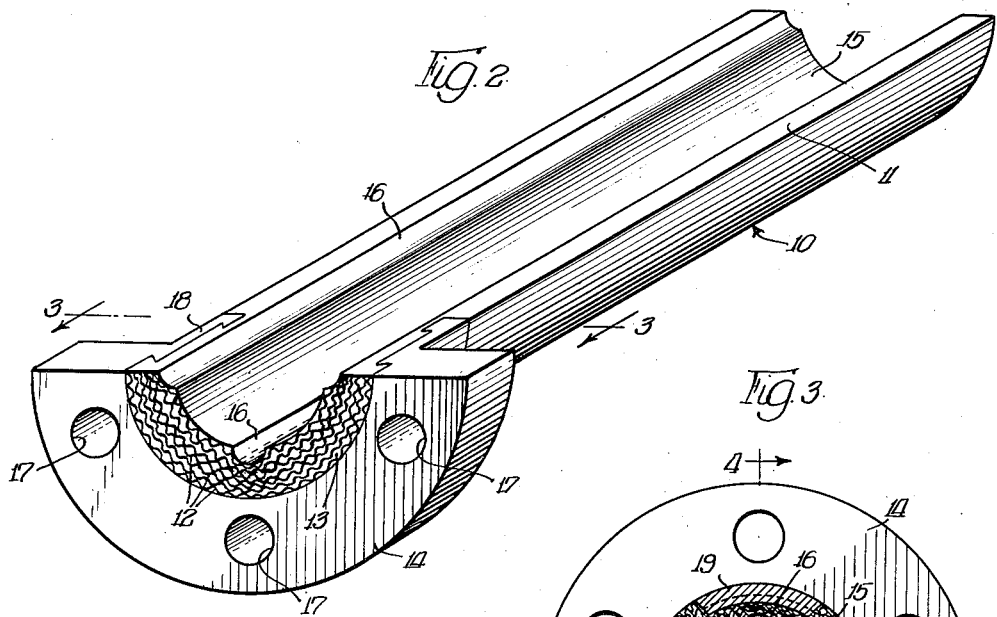
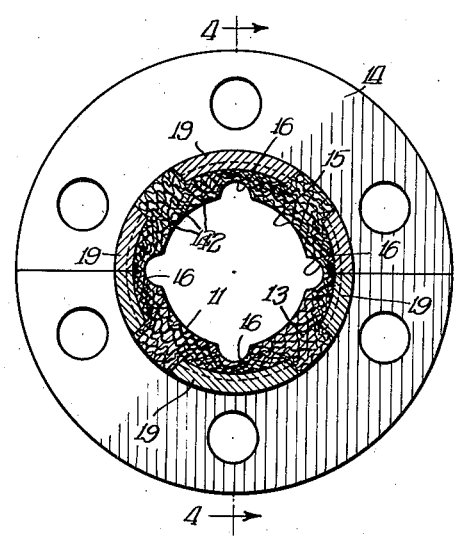
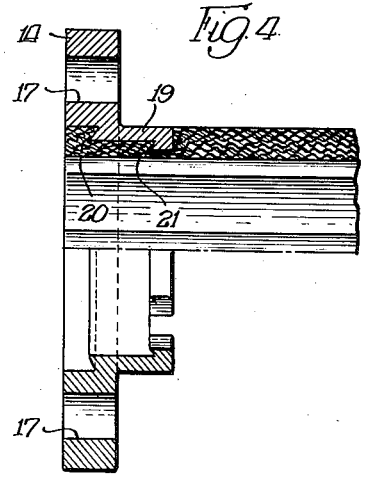
INVENTOR.
Thomas L. Gatke,
BY
Cromwell, Greist, Warden + Butler
attys.

Patented Nov. 20, 1945

2,389,253

UNITED STATES PATENT OFFICE 2,389,253

BEARING

Thomas L. Gatke, Oak Park, Ill.

Application February 12, 1944, Serial No. 522,046

4 Claims. (Cl. 308—238)

The principal object of this invention is to provide a stern tube bearing of improved construction.

The new bearing is inexpensive to manufacture, possesses great strength and excellent anti-friction qualities, and will give long and satisfactory service under the most severe operating conditions.

While the foregoing statements are indicative in a general way of the nature of the invention, other more specific objects and advantages will be apparent to those skilled in the art upon a full understanding of the construction of the new bearing.

A preferred embodiment of the invention is presented herein by way of exemplification, but it will of course be understood that the invention is susceptible of incorporation in other structurally modified forms coming equally within the scope of the appended claims.

In the accompanying drawing:

Fig. 1 is a perspective view of a longitudinally split stern tube bearing constructed in accordance with the invention;

Fig. 2 is a more detailed perspective view of one of the two complementary parts of the bearing;

Fig. 3 is a transverse section through the bearing, taken on the line 3—3 of Fig. 2; and Fig. 4 is a fragmentary longitudinal section, taken on the line 4—4 of Fig. 3.

The bearing shown in the drawing is of the type which has a long journaling barrel and a mounting flange at one end of the barrel. The bearing is preferably made in two laterally separable parts 10.

Each of the parts 10 includes a semi-cylindrical barrel portion 11 which is composed of a plurality of closely compacted concentrically arranged fabric laminations 12, which laminations are solidly molded together under heat and pressure in a binder of synthetic resin 13 or similar material, and a semi-circular end flange portion 14 of bronze or other metal. The composition barrel portion 11 extends completely through the end flange portion 14 and is provided on its inner bearing surface 15 with a plurality of longitudinally extending grooves 16 for facilitating the passage of water or other lubricant through the bearing. The end flange portion 14, which is apertured at 17 for the reception of the usual mounting bolts, is provided with an axially extending semi-circular anchoring portion 18, which anchoring portion is formed as an integral part of the end flange portion and is solidly embedded in the material of the barrel portion flush with the outer surface of the latter.

The anchoring portion 18 is characterized by circumferentially interrupted arcuate sections 19, and is counterbored to form inwardly directed hook-like shoulders 20 and 21, which shoulders penetrate to different depths in the material of the barrel portion, terminating short of the inner bearing surface 15.

A composite bearing constructed as above described is in effect an integral structure, constitutes an excellent stern tube bearing, is easy to insert and secure in a stern tube, has fine wearing and shock qualities, and will stand up indefinitely in service without breaking down under the loads and vibrations to which such bearings are ordinarily subjected in service by the action of the propeller shaft.

While the new bearing has been herein referred to as especially applicable to stern tubes it will, of course, be understood that it can be used advantageously for many other purposes.

I claim as my invention:

1. In a bearing of the type characterized by an elongated tubular barrel and a flange which extends radially from one end of the barrel, a barrel portion of a non-metallic molded bearing composition containing a centrally arranged bore, and a centrally apertured flange portion of metal through which the barrel portion extends and in which the barrel portion is rigidly molded, said flange portion extending inwardly to a point adjacent the bore in the barrel portion and extending outwardly to a point spaced substantially beyond the outer periphery of the barrel portion, and being apertured beyond said outer periphery for the reception of attaching means.

2. In a bearing of the type characterized by a barrel and a radially extending flange at one end of the barrel, a barrel portion of a non-metallic molded bearing composition, and an end flange portion of metal through which the barrel portion extends and in which the barrel portion is molded, said end flange portion being provided within the contour of the barrel portion with an axially extending anchoring portion which is integral with the end flange portion and is characterized by circumferentially interrupted sections embedded in the material of the barrel portion in outwardly spaced relation to the bearing surface of the latter.

3. In a bearing of the type characterized by a barrel and a radially extending flange at one end of the barrel, a barrel portion of a non-metallic molded bearing composition, and an end flange portion of metal through which the barrel portion extends and in which the barrel portion is molded, said end flange portion being provided within the contour of the barrel portion with an axially extending anchoring portion which is integral with the end flange portion and is characterized by circumferentially interrupted sections embedded in the material of the barrel portion in outwardly spaced relation to the bearing surface of the latter, and said circumferentially interrupted sections being counterbored to provide hook-like arcuate projections which penetrate the material of the barrel portion in circumferentially interlocked association with the same.

4. In a bearing of the type characterized by a barrel and a radially extending flange at one end of the barrel, a barrel portion composed of a plurality of closely compacted concentrically arranged fabric laminations, which laminations are solidly molded together under heat and pressure in a binder of synthetic resin, said barrel portion being provided in the bearing surface of the same with a plurality of longitudinally extending grooves, and an end flange portion of metal through which the barrel portion extends and in which the barrel portion is molded, said end flange portion being provided within the contour of the barrel portion with an axially extending anchoring portion of metal which is integral with the end flange portion and is characterized by circumferentially interrupted sections embedded in the material of the barrel portion in outwardly spaced relation to the bearing surface of the latter, and said circumferentially interrupted sections being counterbored to provide hook-like arcuate projections which penetrate the material of the barrel portion in circumferentially interlocked association with the same.

THOMAS L. GATKE.